(12) United States Patent
Alanara

(10) Patent No.: US 8,848,547 B2
(45) Date of Patent: Sep. 30, 2014

(54) APPARATUS AND METHOD FOR SIGNALING BETWEEN A USER EQUIPMENT AND A WIRELESS NETWORK

(75) Inventor: Seppo Matias Alanara, Oulu (FI)

(73) Assignee: Nokia Corporation, Espoo (FI)

( * ) Notice: Subject to any disclaimer, the term of this patent is extended or adjusted under 35 U.S.C. 154(b) by 755 days.

(21) Appl. No.: 12/488,976

(22) Filed: Jun. 22, 2009

(65) Prior Publication Data

US 2010/0323627 A1   Dec. 23, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 48/08* (2009.01)
*H04B 17/00* (2006.01)
*H04W 76/04* (2009.01)
*H04W 24/10* (2009.01)

(52) U.S. Cl.
CPC .......... *H04B 17/0067* (2013.01); *H04L 1/0025* (2013.01); *H04W 48/08* (2013.01); *H04W 76/048* (2013.01); *H04W 24/10* (2013.01); *H04L 1/0027* (2013.01)
USPC ........... 370/252; 370/329; 370/458; 370/459; 455/423; 455/434

(58) Field of Classification Search
USPC .......... 455/423, 450, 574; 370/229, 231, 236, 370/252, 311, 328, 329, 330, 338, 341, 348, 370/431, 436–437
See application file for complete search history.

(56) References Cited

U.S. PATENT DOCUMENTS

| | | | |
|---|---|---|---|
| 6,556,552 B1 * | 4/2003 | Nakagomi et al. | 370/332 |
| 6,765,889 B1 * | 7/2004 | Ludwig | 370/331 |
| 7,046,624 B1 * | 5/2006 | Iwatsuki et al. | 370/229 |
| 7,362,741 B2 * | 4/2008 | Nguyen | 370/345 |
| 2003/0054839 A1 * | 3/2003 | Ono | 455/456 |
| 2006/0058051 A1 * | 3/2006 | Takano et al. | 455/502 |
| 2008/0085710 A1 * | 4/2008 | Prateek | 455/436 |
| 2008/0139242 A1 * | 6/2008 | Hidaka | 455/552.1 |
| 2008/0171547 A1 * | 7/2008 | Moon et al. | 455/436 |
| 2008/0189970 A1 * | 8/2008 | Wang et al. | 33/701 |
| 2009/0161611 A1 * | 6/2009 | Kuroda | 370/329 |
| 2009/0168662 A1 * | 7/2009 | Tsuboi et al. | 370/252 |
| 2009/0168731 A1 * | 7/2009 | Zhang et al. | 370/336 |
| 2009/0316633 A1 * | 12/2009 | Kato et al. | 370/329 |
| 2010/0034145 A1 * | 2/2010 | Kim et al. | 370/328 |
| 2010/0067418 A1 * | 3/2010 | Parkvall et al. | 370/311 |
| 2010/0135267 A1 * | 6/2010 | Strutt et al. | 370/338 |
| 2010/0195524 A1 * | 8/2010 | Iwamura et al. | 370/252 |
| 2010/0290420 A1 * | 11/2010 | Dalsgaard et al. | 370/329 |
| 2011/0205928 A1 * | 8/2011 | Pelletier et al. | 370/252 |

OTHER PUBLICATIONS

"Minimising Service Interruption Time to Acquire Relevant System Information for Inbound Handover to CSG cells in LTE", 3GPP TSG RAN WG2 #66, Vodafone Contribution, May 4-8, 2009, San Francisco, California USA.

(Continued)

*Primary Examiner* — Magdi Elhag
(74) *Attorney, Agent, or Firm* — Harrington & Smith

(57) ABSTRACT

In accordance with an example embodiment of the present invention, a method is disclosed that comprises deciding at a user equipment (UE) an outage period during which the UE has limited communications with the serving base station; and sending to the serving base station a signaling message indicating the outage period.

19 Claims, 6 Drawing Sheets

(56) References Cited

OTHER PUBLICATIONS

Nokia Siemens Networks, Nokia Corporation, "CSG enhanced mobility requirements", 3GPP TSG-RAN WG2 Meeting #66 R2-093217 San Francisco, U.S.A. May 4-8, 2009.

3GPP TSG-RAN WG2 Meeting #66, R2-093217, San Francisco, U.S.A., May 4-8, 2009; Source: Nokia Siemens Networks, Nokia Corporation; Title:CSG enhanced mobility requirements (3 pages).

* cited by examiner

APPARATUS AND METHOD FOR SIGNALING BETWEEN A USER EQUIPMENT AND A WIRELESS NETWORK

TECHNICAL FIELD

The present application relates generally to an apparatus and a method for signaling between a user equipment and a wireless network

BACKGROUND

There may be multiple types of signaling between a serving base station such as a long-term evolution (LTE) base station evolution node B (eNB) and a user equipment (UE). One type of signaling is for the eNB to schedule the UE to perform measurements on a continuous basis and then to report back the measurements while the UE is in an active state. The serving base station may then take actions based on the measurement report or absence of it. This type of signaling may become complicated, because the serving base station may need to interleave the measurements with other tasks and schedule measurement gaps for taking measurements. For example, in case of a VOIP call, the UE may receive and transmit VOIP packets every 20 milliseconds (ms) and execute the measurements between the uplink and downlink allocations indicated to the UE on the physical downlink control channel (PDCCH). In some cases, the UE resources may be fully allocated by the serving base station to transmit data at every transmission time interval (TTI) of radio frames and the UE may not have any gap to take measurements.

Closed subscriber groups (CSGs) may make it more difficult for the UE to complete data transmission and reception using the resources assigned by the serving base station. For example, in addition to performing PDCCH monitoring, measurements and transmission of measurement reports, the UE may need to tune to a CSG broadcast to obtain a master information block (MIB) and a system information block (SIB) in order to verify the identity of the CSG using the SIB. The CSG may be a local wireless network that has a smaller coverage area than a regular cellular cell and may use a standard signaling such as a LTE signaling to communicate with a LTE UE. A CSG base station conforming to LTE standards may be viewed as an eNB. An example CSG is a private enterprise network that may allow a UE to enter its network for a better service quality or other reasons. There may be multiple CSG base stations available for the UE to consider in one location. It may be possible that multiple CSG base stations may be assigned a same physical cell identifier (PCI). The UE may need to verify the true identity of a CSG that the UE considers to enter. In a case of possible confusion about the true identity of the CSG, available processing gaps at the UE may not be sufficient to allow the UE to process the system information from the CSG base station to verify the identity of the CSG base station.

An additional complicating factor for signaling between the UE and the serving base station is that an increasing number of applications may run on the UE. The example of the applications may include a camera application, an office application, a web browsing application, a music application, a navigation application, and the like. These applications along with other processing tasks may make it difficult for the UE to schedule sufficient processing gaps to perform other tasks such as taking measurements.

SUMMARY

Various aspects of the invention are set out in the claims.

In accordance with an example embodiment of the present invention, a method comprises deciding at a user equipment (UE) an outage period during which the UE has limited communications with the serving base station; and sending to the serving base station a signaling message indicating the outage period.

In accordance with an example embodiment of the present invention, an apparatus comprises a radio resource management module configured to decide an outage period during which the apparatus has limited communications with the serving base station and sends to the serving base station a signaling message indicating the outage period.

In accordance with another example embodiment of the present invention, an apparatus comprises a transceiver configured to receive a signaling message from a user equipment (UE) indicating an outage period; and a resource scheduler configured to suspend protocol operations for the UE upon receiving the signaling message; and continue transmitting data to the UE if there is real-time sensitive data available for transmission during the outage period.

BRIEF DESCRIPTION OF DRAWINGS

For a more complete understanding of example embodiments of the present invention, reference is now made to the following descriptions taken in connection with the accompanying drawings in which.

DETAILED DESCRIPTION

One example embodiment of the present disclosure is that the UE may not complete all assigned processing tasks such as CSG PCI verification and other applications during scheduled or unscheduled measurement gaps during a processing cycle. In one embodiment, the UE may verify a CSG PCI as requested by the serving base station or based on historical data stored at the UE. In order to verify the CSG PCI, the UE receives a CSG eNB SIB1 which contains the information uniquely identifying the CSG. The UE may indicate to the serving eNB a need for additional time for the UE to read the CSG system information to verify the CSG identity. The UE may read a master information block (MIB) first, which may be broadcast by the CSG base station at a time interval ranging from 10 to 40 milliseconds (ms). After processing the MIB, the UE may read a SIB1 which may be broadcast at 80-millisecond intervals. During this period of 90-120 ms, the UE may not be able to respond to requests such as a measurement requests from the serving base station. This period may be viewed as an outage period because the serving base station may not receive any response from the UE during the outage period. The serving base station may respond to the absence of a response such as a measurement report as an indication of a link failure or link quality degradation, and may perform a link adaptation as part of a protocol operation. This may not be desirable because the link quality may not have changed and the UE simply was too busy to respond during the outage period. One example embodiment of the present invention is that once the UE decides that it can not complete all data transmissions as assigned by the serving base station or eNB, the UE may send a signaling message to the serving base station to indicate an outage period. During the outage period, the serving base station may suspend its normal protocol operations such as analyzing measurement data, or absence of it and taking appropriate action with the UE accordingly. During the outage period, the UE may avoid sending any signaling message to the serving base station and focus on verifying CSG PCIs and other application processing tasks instead. After the outage period expires, then both the UE and the serving base station may resume normal protocol operations such as taking measurement and transferring uplink/downlink application data.

Figure 1:
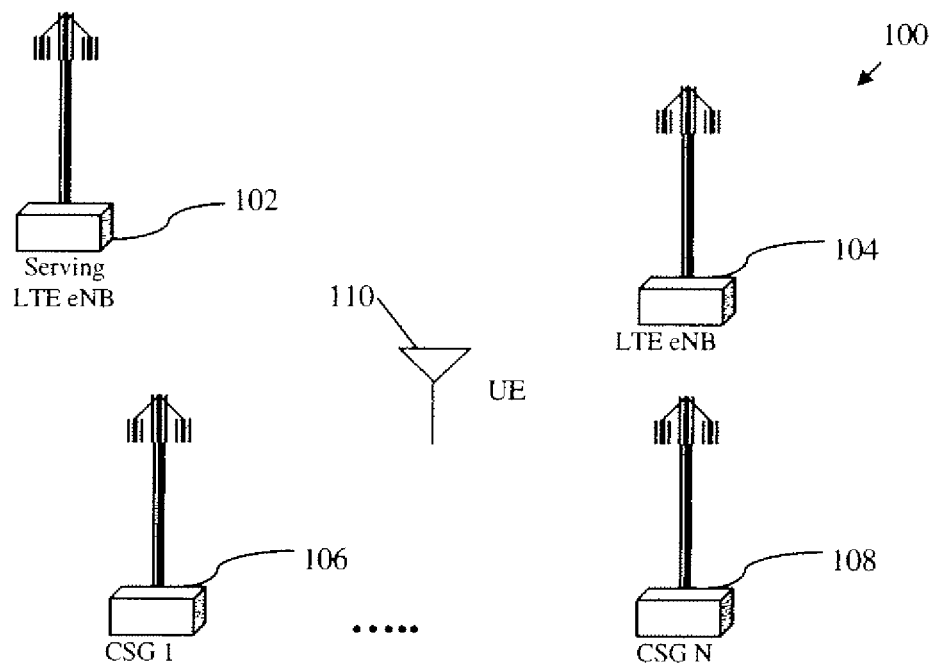
FIG. 1 illustrates an example wireless network.

FIG. 1 illustrates a wireless network 100 that includes two LTE base stations, a number of CSG base stations and a UE. The LTE eNB 102 is the serving base station for the UE 110 and the UE 110 is currently within the coverage area of the LTE eNB 104. The UE 110 is also within the coverage areas of a number of CSG base stations, the CSG1 106 to CSGn 108. In the remainder of this disclosure, the term serving base station and the term serving eNB are used interchangeably when there is no ambiguity from the context.

FIG. 1 illustrates an example embodiment of a signaling between the serving base 102 and the UE 110. When the UE 110 with an active call moves away from the serving LTE eNB 102 and toward the coverage areas of the LTE eNB 104 and the CSG1 106 through CSGn 108, the UE 110 may investigate all cells that are potential targets to roam into next. At the same time, the UE 110 may perform measurements as commanded by the serving base station eNB 102 to maintain the active call. The UE 110 may enter an intensive investigation period with the potential target cells. Instead of normal protocol operations where the UE 110 sends the measurement reports and performs the uplink and downlink application data transmission/reception, UE 110 may send one signaling message to inform the eNB 102 that it is about to enter an outage period during which the UE 110 suspends its normal protocol operations such as sending the measurement reports and/or uplink and downlink data. In response, the serving eNB 102 may also suspend its protocol operations for the UE 110 for the indicated outage period. Once the outage period expires, both the UE 110 and the serving base station may resume the normal protocol operations.

Figure 2:
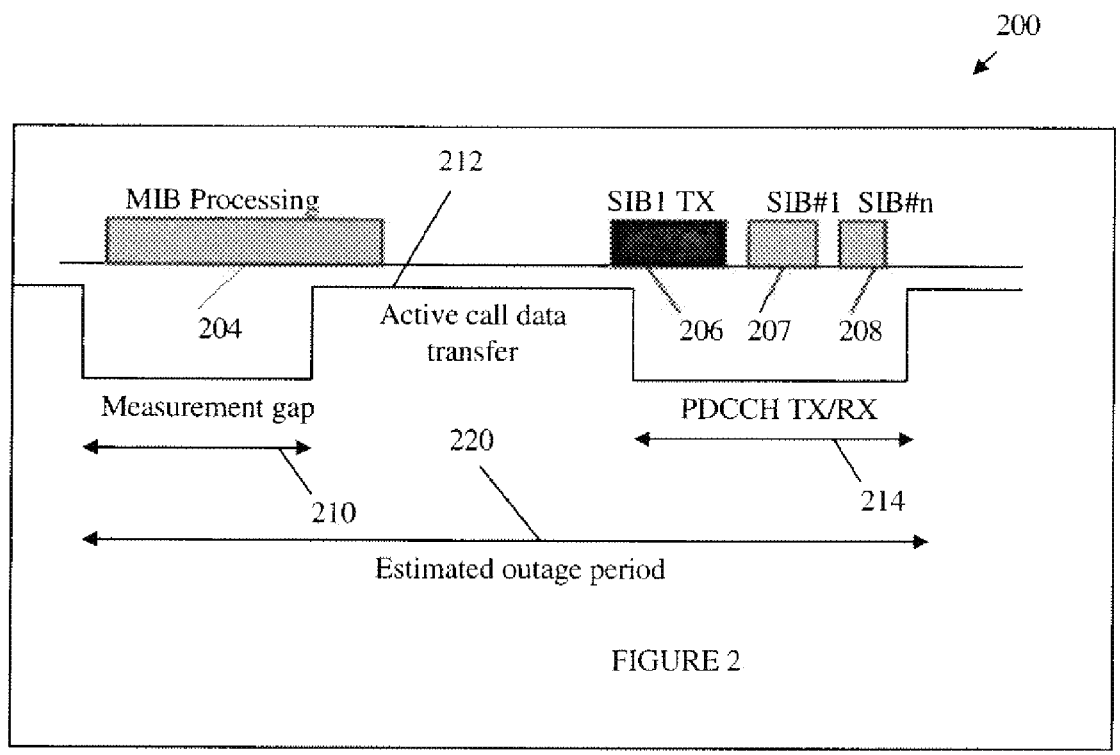
FIG. 2 illustrates an example processing cycle.

FIG. 2 illustrates an example outage period within a processing cycle 200. The processing cycle 200 may include a scheduled measurement gap 210 for the UE to take measurement, and a PDCCH data transfer period 214 and an active call data transfer period 212. In one example embodiment, the UE has entered an area where multiple CSG base stations are present as illustrated in the wireless network 100 of FIG. 1. The CSG base station may broadcast messages which each may include a master information block (MIB) and a system information block (SIB). The UE may need to verify the PCI of each CSG base stations by reading into each MIB and SIB. In the example embodiment, the UE processes the MIB during the scheduled measurement gap 210 and read SIBs 206 through 208 during the scheduled PDCCH transmission/reception period 214. As a result, the UE is not able to take measurements, report the measurement reports and perform PDCCH data transfer as scheduled. Instead of having many signaling message exchanges between the UE and the serving base station, the UE sends a signaling message to indicate an outage period 220 at onset of the processing cycle 200. During the outage period, both the serving base station may not expect any measurement report from the UE and suspend its normal protocol operations. The UE suspends its protocol operations as well.

Figure 3:
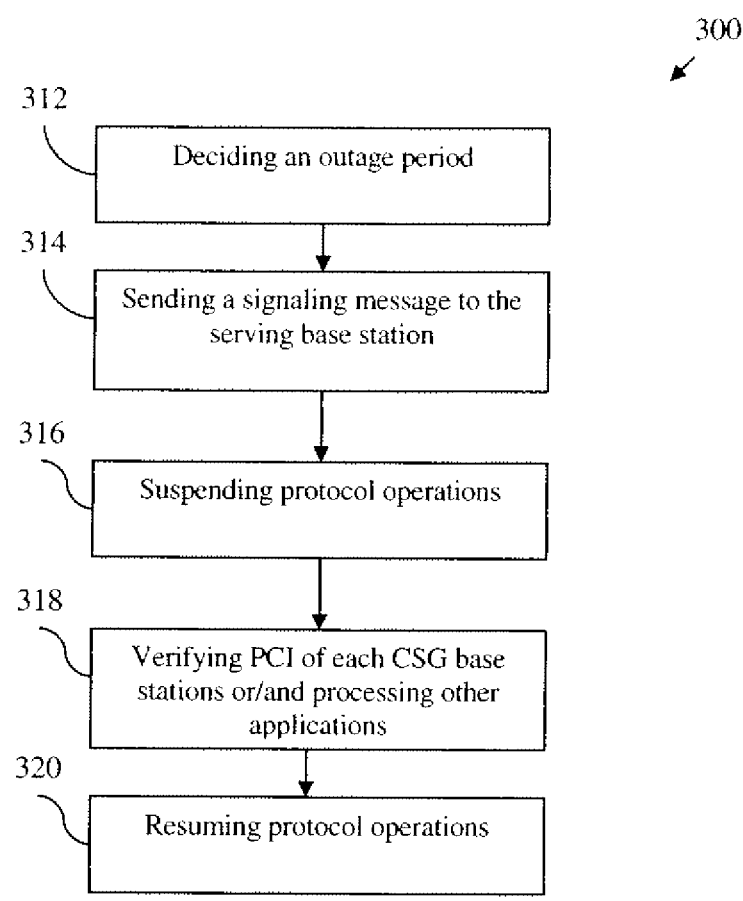
FIG. 3 illustrates an example method for support of a signaling at UE.

FIG. 3 illustrates an example method 300 for support of a signaling at a UE. The method 300 may include deciding an outage period at block 312, sending a signaling message to a serving base station at block 314, and suspending protocol operations at block 316. The method 300 may also include verifying identity of each CSG base station and/or processing other application data at block 318 and resuming protocol operations at block 320.

Figure 4:
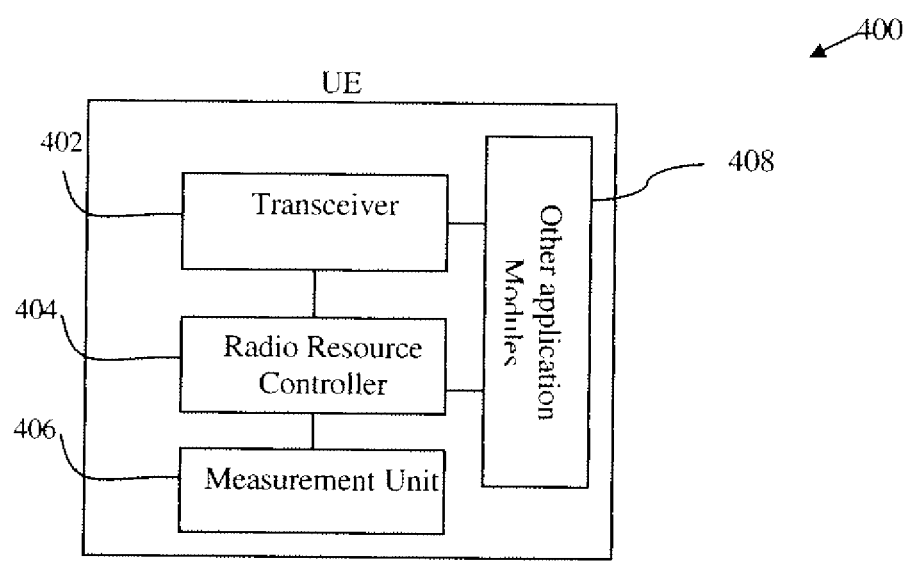
FIG. 4 illustrates an example apparatus for support of a signaling at the UE.

In one example embodiment, the method 300 may be implemented in the UE 110 of FIG. 1 or in the wireless apparatus 400 of FIG. 4. The method 300 is for illustration only and the steps of the method 300 may be combined, divided, or executed in a different order than illustrated, without departing from the scope of the invention of this example embodiment.

Deciding the outage period at block 312 may include taking into account the number of CSG base stations that are in the proximity of the UE and may be the next target cell for the UE to consider entering. More CSG base stations are there in the proximity, more time the UE may spend on verifying the PCI of each CSG base station, and less likely that the UE would be able to perform protocol operation such as responding to the PDCCH allocation requests for uplink/downlink data transmissions from the serving base station. Deciding the outage period block 312 may also include taking into account the number of available processing gaps that may naturally occur or have been scheduled for the UE, and the length of each processing gap. Other factors for deciding the outage period may include the number of processing requests from other UE applications and how urgent each request may be. The other UE applications may include one or more of a camera application, an office application, a music application, a navigation application, an advertisement application, a web application and the like.

Sending a signaling message to the serving base station at block 314 may include sending a new or an existing radio resource control (RRC) message to indicate to the serving base station the outage period. The signaling message may include at least a message type and the message type alone may be sufficient for the serving base station to take an action accordingly without reading into the content of the signaling message. Optionally, the message may indicate an outage duration during which the UE suspends normal protocol operations such as sending a measurement report to the serving base station.

Suspending protocol operations at block 316 may include suspending regular protocol operations such as responding to PDCCH allocation requests or sending measurement reports to the serving base station during the outage period. However, during this outage period, the UE may continue to receive or send application data on a downlink/uplink from/to the serving base station as it would normally do unless the required processing gap for verifying CSG identification overlaps with the uplink/downlink data transmission. In some example embodiment, suspending protocol operation at block 316 may only suspend the protocol operations such as the measurement signaling protocol and may not affect other protocol operations and data transmission.

Verifying PCI of each CSG base stations and/or processing other applications at block 318 may include performing one or more processing tasks that keeps the UE from performing protocol operation such as responding to a PDCCH request and sending the measurement reports to the serving base station. One type of processing task is to verify the PCIs of each neighbor CSG base station. Because two CSG base stations may have a same PCI, the UE may need to decode the MIB and the SIB from each CSG base station and read out the contents of each MIB and SIB to ascertain the identity of the CSG base station. For example, in the $3^{rd}$ generation partner project (3GPP) standard specification, a special SIB message designated as SIB1 message may contain a CSG-identity field that is uniquely associated with each CSG. The other types of processing tasks may include those tasks for a camera application, an office application, a navigation application and the like.

Resuming protocol operations at block 320 may include resuming PDCCH operations and/or taking measurements and sending measurement reports to the serving base station. In one example embodiment, after the outage period expires, the UE receives a new measurement request that may include another set of processing periods and measurement gaps. The UE may resume protocol operations such as taking measurements during the scheduled measurement periods as commanded by the serving base station and sending the measurement reports to the serving base station during the scheduled measurement gaps.

In one example embodiment, the UE 110 enters the coverage areas of the multiple CSG base stations CSG1 106 through CSGn 108 of FIG. 1. The UE 110 may check its available time gaps and pending processing tasks, and decides that the available gaps are not sufficient to complete the pending processing tasks. The UE 110 may send an outage indication signaling message to the serving base station 102 to indicate that the UE 110 will suspend its normal protocol operations for a designated period of time. Then the UE 110 may focus on the pending processing tasks that may include verifying each CSG PCI and processing requests from other applications. After the outage period expires, the UE 110 may resume protocol operation such as receiving a measurement request from the serving base station 102 that schedules processing cycle with a number of processing periods and gaps. This time the UE 110 may proceed without suspending the protocol operations.

FIG. 4 illustrates an example apparatus 400 that is configured to support the outage indication signaling at the UE. The apparatus 400 may include a transceiver 402, a radio resource controller 404, a measurement unit 406 and other application modules 408. The transceiver 402 may be configured to receive a protocol operation request such as a measurement request from a serving base station such as the serving base station 102 of FIG. 1. The transceiver 402 may also perform measurements and send the measurement reports to the serving base station 102, in addition to receiving application data from the serving base station 102.

The radio resource controller 404 may be configured to decide an outage period and to send to the serving base 102 a signaling message to indicate the outage period. In deciding the outage period, the radio resource controller 404 may take into account the available gaps and processing periods assigned by the serving base station, and decide whether the available measurement gaps are sufficient to accomplish all the pending tasks. The tasks may include verifying each CSG PCI, processing other application requests, and reporting the measurement reports to the serving base station. Once the target CSG PCI is verified, the radio resource controller 404 may report the target CSG PCI to the serving base station to make a handover decision.

The measurement unit 406 may be configured to perform measurements during a measurement gap if the measurement protocol operation is not suspended. The other application modules 408 may include hardware parts and software parts and may include one or more of a UE camera application module, a UE office application module, a UE music application module, a UE navigation application module, a UE advertisement application module, a UE web application module and the like.

Figure 5:
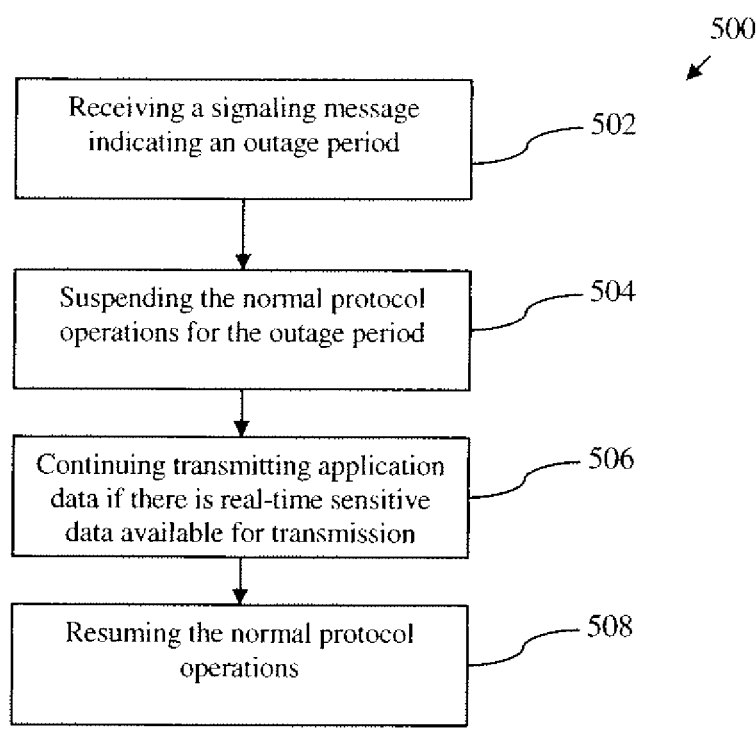
FIG. 5 illustrates an example method for support of a signaling at a base station.

FIG. 5 illustrates an example method 500 for support of an outage signaling at a base station. The method 500 may include receiving a signaling message indicating an outage period at block 502, and suspending regular protocol operations with the UE for the indicated duration at block 504. The method 500 may include continuing transmitting application data if there is real-time sensitive data available for transmission at block 506 and resuming the normal protocol operations at block 508. In one embodiment, the method 500 may be implemented in the serving base station 102 of FIG. 1 or in the wireless apparatus 600 of FIG. 6. The method 500 is for illustration only and the steps of the method 500 may be combined, divided or executed in a different order without departing from the scope of the invention of this example embodiment.

Receiving a signaling message indicating an outage period at block 502 may include receiving a RRC message sent from the UE 110 to indicate an outage period. The signaling message may include an outage message type identifier so that the serving base station 102 may know the message by the message type in the message header. Suspending the normal protocol operations for the indicated outage duration at block 504 may include suspending normal protocol operations such as analyzing a measurement report data or an absence of it. The measurement data may indicate a link quality and the absence of the measurement report may indicate a link failure. In response, the serving base station 102 may take measures such as reallocating a transmission channel, increasing transmitting power, and the like. These protocol operations are suspended during the outage period with the knowledge that the UE may be too busy in processing other applications to send the measurement reports.

Continuing transmitting application if there is real-time sensitive data available for transmission at block 506 may include transmitting application data to the UE despite an absence of a measurement report from the UE during the outage period. For example, there may be an active voice call in progress. The real-time sensitive voice call data is still sent to the UE and received from the UE, despite the fact that link quality may be unknown to the serving base station because of the absence of the measurement reports. Whether the data is real-time sensitive may depend on a variety of factors, such as the type of application, a service level agreement with a particular user, and the like. For example, the data for a voice call is more real-time sensitive than the data for a web browsing session, given everything else being equal. Resuming the normal protocol operations at block 508 may include reverting back to normal protocol operations after the outage period. Once the outage period expires, the serving base station may set its protocol operation back to a normal mode, rescheduling a processing cycle, expecting measurement reports from the UE and taking actions according to the contents and presence/absence of the measurement reports.

Figure 6:
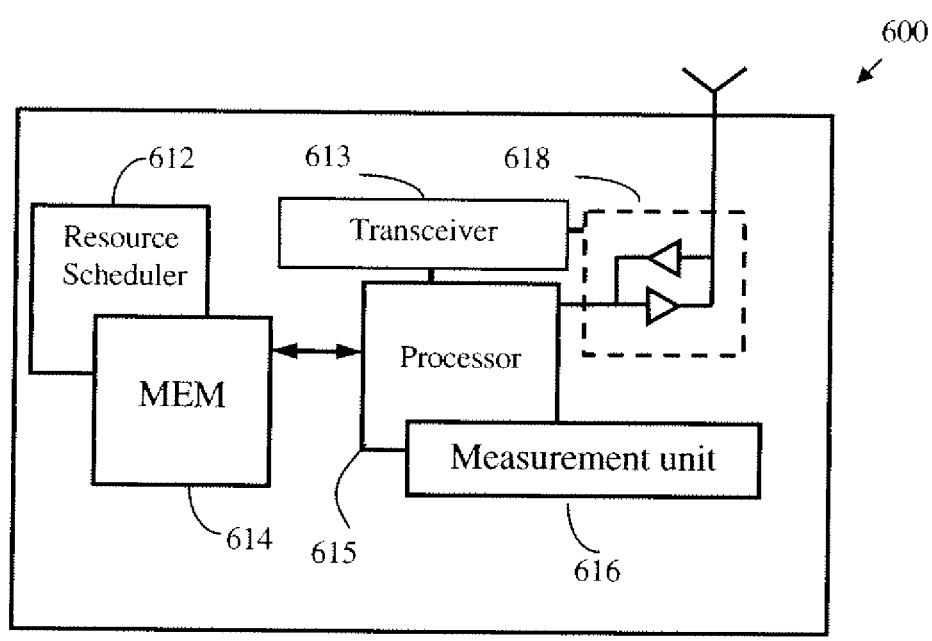
FIG. 6 illustrates an example wireless apparatus.

FIG. 6 illustrates a simplified block diagram of an exemplary wireless device that is suitable for use in practicing the exemplary embodiments of at least part of this invention. In FIG. 6, the device 600 may include a processor 615, a memory 614 coupled to the processor 615, and a suitable transceiver 613 (having a transmitter (TX) and a receiver (RX)) coupled to the processor 615, coupled to an antenna unit 618. The memory 614 may store programs such as a resource scheduler 612.

The processor 615 or some other form of generic central processing unit (CPU) or special-purpose processor such as digital signal processor (DSP), may operate to control the various components of the wireless device 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

The transceiver 613 is for bidirectional wireless communications with another wireless device. The transceiver 613 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 615 or other central processing unit. In some embodiments, the transceiver 613, portions of the antenna unit 618, and an analog baseband processing unit may be combined in one or more processing units and/or application specific integrated circuits (ASICs).

The antenna unit 618 may be provided to convert between wireless signals and electrical signals, enabling the wireless device 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna unit 618 may include antenna tuning and/or impedance matching components, RF power amplifiers, and/or low noise amplifiers.

As shown in FIG. 6, the device 600 may further include a measurement unit 616, which measures the signal strength level that is received from another wireless device, and compare the measurements with a configured threshold. The measurement unit may be utilized by the device 600 in conjunction with various exemplary embodiments of the invention, as described herein. In one embodiment, the resource scheduler 612 may be configured to schedule a processing cycle, and decide an outage period and gaps for the UE 102, take actions according to the contents and absence of a measurement report from the UE 102, and suspend measurement protocol operations for the UE 102 if an outage measurement signaling message is received.

In general, the various exemplary embodiments of the device 600 may include, but are not limited to, part of a base station, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Without in any way limiting the scope, interpretation, or application of the claims appearing below, a technical effect of one or more of the example embodiments disclosed herein may be a method for support of measurement signaling between a UE and a wireless network.

Embodiments of the present invention may be implemented in software, hardware, application logic or a combination of software, hardware and application logic. The software, application logic and/or hardware may reside on a mobile station or user equipment, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. A method, comprising:
    deciding at a user equipment (UE) an outage period during which the UE has limited communications with a serving base station;
    sending to the serving base station a signaling message indicating the outage period; and
    resuming a protocol operation after the outage period expires,
    wherein the protocol operation comprises at least one of: taking a measurement, sending a measurement report to the serving base station, or monitoring a physical downlink control channel, and
    wherein deciding the outage period comprises deciding whether a plurality of available processing gaps are exhausted, wherein the processing gaps are allocated to the UE to perform measurements of a plurality of closed subscriber group (CSG) base stations, and wherein deciding whether the available processing gaps are exhausted comprises taking into account the number of closed subscriber group (CSG) base stations and verifying a physical cell identifier (PCI) of each of the CSG base stations.

2. The method of claim 1, further comprising:
suspending at least one of the plurality of protocol operations during the outage period.

3. The method of claim 1, wherein deciding whether the available gaps are exhausted comprises taking into account an amount of time required for reading and processing at least one of a master information block (MIB) and a system information block (SIB) from the CSG base station.

4. The method of claim 3, wherein reading and processing the at least one of the master information block and system information block comprises at least one of scanning a broadcast message from the CSG base station, decoding one of the master information block, and the system information block from the broadcast message, reading out the physical cell identifier field and checking for a permission to enter a coverage area of the CSG base station.

5. The method of claim 1, wherein deciding the outage period further comprises taking into account a current processing load for at least one of a UE camera application, a UE office application, a UE music application, a UE navigation application, a UE advertisement application and a UE web application.

6. The method of claim 1, wherein sending the signaling message comprises sending a radio resource control (RRC) message to the serving base station wherein the signaling message includes an outage message type identifier.

7. The method of claim 1, further comprising resuming at least one of a plurality of protocol operations including taking measurement, sending a measurement report to the serving base station, and monitoring a physical downlink control channel after the outage period expires.

8. An apparatus, comprising:
at least one processor; and at least one memory including computer program code, the at least one memory and the computer program code configured, with the at least one processor, to cause the apparatus to perform at least the following:
deciding an outage period during which the apparatus has limited communications with a serving base station;
sending to the serving base station a signaling message indicating the outage period; and
resuming a protocol operation after the outage period expires,
wherein the protocol operation comprises at least one of: taking a measurement, sending a measurement report to the serving base station, or monitoring a physical downlink control channel, and
wherein deciding the outage period comprises deciding whether a plurality of available processing gaps are exhausted, wherein the processing gaps are allocated to the UE to perform measurements of a plurality of closed subscriber group (CSG) base stations, and wherein deciding whether the available processing gaps are exhausted comprises taking into account the number of closed subscriber group (CSG) base stations and verifying a physical cell identifier (PCI) of each of the CSG base stations.

9. The apparatus of claim 8, further comprising a transceiver configured to read a broadcast message including at least one of a master information block (MIB) and a system information block (SIB) from each of a plurality of neighboring closed subscriber group (CSG) base stations.

10. The apparatus of claim 9, further comprising a measurement module configured to take measurements and cause to send a measurement report to the serving base station.

11. The apparatus of claim 8, wherein the signaling message comprises at least one of an outage message type identifier and a time duration during which no measurement report is sent to the serving base station.

12. The apparatus of claim 8, wherein the apparatus is in one of an idle state and an active state.

13. The apparatus of claim 8, wherein the apparatus is one of a $3^{rd}$ generation partner project (3GPP) UE, a long-term evolution (LTE) UE, a LTE-advanced UE, and a $4^{th}$ generation (4G) UE.

14. An apparatus, comprising:
a transceiver configured to receive a signaling message from a user equipment (UE) indicating an outage period wherein the apparatus has limited communications with the UE; and
a resource scheduler configured to
suspend protocol operations for the UE upon receiving the signaling message;
continue transmitting data to the UE if there is real-time sensitive data available for transmission during the outage period; and
resume a protocol operation after the outage period expires,
wherein the protocol operation comprises at least one of: taking a measurement, reallocating a transmission channel, or increasing transmitting power, and
wherein the outage period is decided by the UE and comprises deciding whether a plurality of available processing gaps are exhausted, wherein the processing gaps are allocated to the UE to perform measurements of a plurality of closed subscriber group (CSG) base stations, and wherein deciding whether the available processing gaps are exhausted comprises taking into account the number of closed subscriber group (CSG) base stations and verifying a physical cell identifier (PCI) of each of the CSG base stations.

15. The apparatus of claim 14, wherein the apparatus is configured to cause the UE to perform at least one of UE protocol operations including at least taking measurements and monitoring physical downlink control channel.

16. The apparatus of claim 15, wherein the protocol operations comprise at least performing a link adaptation upon a link failure as indicated by an absence of a measurement report from the UE.

17. The apparatus of claim 16, wherein the radio resource scheduler is configured to resume the protocol operations for the UE after the outage duration.

18. The apparatus of claim 14, wherein the signaling message comprises an outage duration during which no measurement report is expected from the UE.

19. The apparatus of claim 16, wherein the apparatus is one of a long-term evolution (LTE) base station, a LTE-advanced base station, and a $4^{th}$ generation (4G) base station.

* * * * *